United States Patent
Nishikawa

(10) Patent No.: US 6,378,033 B1
(45) Date of Patent: Apr. 23, 2002

(54) ELECTRONIC DEVICE, CONTROL METHOD THEREOF AND STORAGE MEDIUM

(75) Inventor: Hiroshi Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,220

(22) Filed: Aug. 31, 1999

(30) Foreign Application Priority Data

Aug. 31, 1998 (JP) .......................................... 10-246267

(51) Int. Cl.⁷ .............................................. G06F 12/02
(52) U.S. Cl. ........................ 711/103; 711/153; 711/156; 711/173; 365/185.33
(58) Field of Search ................................ 711/103, 153, 711/156, 173; 365/185.33

(56) References Cited

U.S. PATENT DOCUMENTS

| | | | |
|---|---|---|---|
| 5,473,569 A | 12/1995 | Chwu | 365/185.11 |
| 6,014,724 A * | 1/2000 | Jenett | 711/103 |
| 6,014,755 A * | 1/2000 | Wells et al. | 714/8 |
| 6,038,636 A * | 3/2000 | Brown, III et al. | 711/103 |
| 6,170,066 B1 * | 1/2001 | See | 714/22 |

* cited by examiner

*Primary Examiner*—Hiep T. Nguyen
(74) *Attorney, Agent, or Firm*—Fitzpatrick, Cella, Harper & Scinto

(57) ABSTRACT

To erase data stored in a flash memory at high speed with simple processing and to improve operation environment, a file stored in the flash memory is managed by small blocks smaller than a rewriting unit, and small blocks are linked to each other so that a file having a size of plural blocks can be constructed. When a file erase command is inputted, an ineffective code is written in an area indicative of effectiveness/ineffectiveness of each block which constructs the file subjected to erasing. Writing an ineffective code is easily realized, without erasing the flash memory, by changing at least one bit of the effective code from "1" to "0". When the set time comes, blocks storing ineffective codes are organized.

12 Claims, 9 Drawing Sheets

ELECTRONIC DEVICE, CONTROL METHOD THEREOF AND STORAGE MEDIUM

BACKGROUND OF THE INVENTION

The present invention relates to an electronic device having a flash memory and control method of the electronic device, and a storage medium.

Lately, portable-type electronic device (e.g., an electronic organizer, electronic notepad, electronic scheduler, or a device integrating these devices) are widely use. Since this type of device is designed to be used on the road, the device is required to maintain data even if the battery power runs out.

Meanwhile, many inventions have been proposed for erase processing of a flash memory. For instance, Motorola's U.S. Pat. No. 5,473,569 proposes a control method in which a particular block is designated as a copy block, data in a memory block to be erased is moved to the copy block, then after all the necessary data is moved to the copy block, the memory block is erased, and the erased memory block is used as a new copy block.

This processing is performed for the following reason. In a memory such as SRAM, data can be written in byte units, and erasing data before writing is unnecessary. On the contrary, in a flash memory, a relatively large block of data (normally, 64K bytes-byte unit) must be erased before writing data in an address designated by byte units. According to the proposed invention, in a case where the memory block contains both effective data and data subjected to erasing, the effective data is temporarily saved in another memory such as SRAM or the like before the data is erased, and then the effective data is written back to the memory block.

However, in the above-described conventional art, for instance, when a file is erased, all files except the file subjected to erasing are written sequentially in a copy block having a large block size (64K bytes) in a flash memory. Therefore, an index managing effective blocks must be changed at each erase operation, requiring complicated and time consuming processing. In addition, if the available area of the memory is smaller than the file size, an erased memory block must be searched for.

SUMMARY OF THE INVENTION

The present invention is made in consideration of the above situation, and has as its object to provide an electronic device and control method thereof as well as a storage medium for erasing data stored in a flash memory at high speed with simple processing and improving an operation environment.

In order to attain the above object, the electronic device of the present invention has the following configuration.

More specifically, the present invention provides an electronic device having a flash memory, comprising: management means dividing a sector of the flash memory indicative of an erase unit into a plurality of blocks, having an area for storing code data indicative of whether data stored in each block is effective or ineffective, and having file management data for managing a file by one or a plurality of blocks; first erase means for writing an ineffective code in the area of each block constructing the file, when an erase request for erasing a file stored in the flash memory is inputted; transfer means for transferring, sector by sector, effective blocks of the sector except blocks storing an ineffective code, to a predetermined volatile memory at a predetermined timing, while maintaining a relative position of a storage address of each effective block; second erase means for erasing a sector of interest in the flash memory after transfer operation is performed by the transfer means; and write means for writing the effective blocks, which have been transferred to the volatile memory, in the erased sector while maintaining the relative position of the storage address of each effective block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the, accompanying drawings.

Note that although the present embodiments describe portable electronic devices as an example, it is apparent from the following description that the present invention is not limited to this example, but is applicable to any other electronic devices.

First Embodiment

Figure 1:
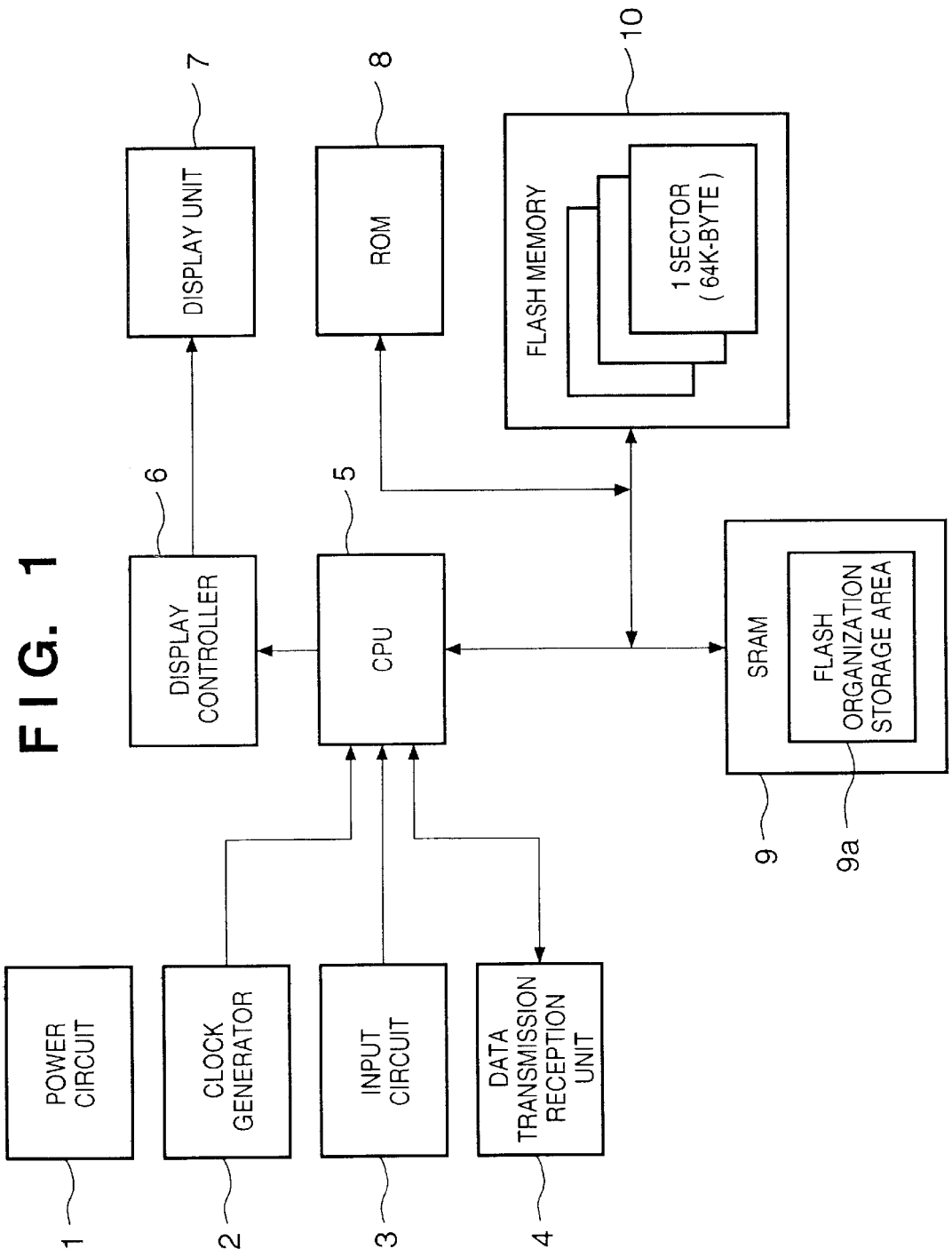
FIG. 1 is a block diagram of an electronic device according to a first embodiment of the present invention.

FIG. 1 is a block diagram which best shows a construction of a flash memory control apparatus in an electronic device according to a first embodiment of the present invention. In FIG. 1, reference numeral 1 denotes a power circuit which generates voltage to be supplied to semiconductors such as a flash memory, SRAM, ROM, CPU or the like which will be described later, and generates voltage for a display device or data communication device. Reference numeral 2 denotes a clock generator which generates a high-speed clock for a CPU to control data processing, a low-speed clock for time count, a low-speed clock for displaying, and a low-speed clock for data communication, which will be described later.

Reference numeral 3 denotes an input circuit employing a touch panel. The input circuit 3 detects a position touched on the touch panel, transfers the digitized detection result to the CPU, and triggers execution of CPU control.

Reference numeral 4 denotes a data transmission/reception unit including a voltage conversion connector cable for control signals and data signals, for receiving data from an external device and storing a data file received by the CPU control in a flash memory, or for transmitting a data file stored in the flash memory by the CPU control. The data transmission/reception unit 4 is used for transmitting/receiving mail by connecting with a communication line, or transferring/receiving data to/from a host computer by connecting with the host computer.

Reference numeral 5 denotes a central processing unit (CPU) which executes data processing control according to program processing steps stored in ROM 8 to be described later, based on the data received by the input circuit 3 or data transmission/reception unit 4.

Reference numeral 6 denotes a display controller which stores data for displaying results of data processing control of the CPU 5, and sequentially outputs display data to a display unit according to a display timing signal, and generates a voltage for displaying based on the voltage applied by the power circuit 1 to be supplied to the display unit.

Reference numeral 7 denotes an LCD display unit .employing a liquid crystal displaying technique for displaying data received from the display controller 6. As mentioned above, a touch panel is provided on the front surface of the display unit 7. For instance, a position pointed by a pen is subsequently detected, and the resultant locus is displayed on the display unit 7 as if the image is written on paper.

Reference numeral 8 denotes a read-only memory (ROM) storing OS, various application programs, memory control programs, and font data.

Reference numeral 9 denotes SRAM (may be substituted by DRAM) which is used as a work memory of the CPU. The SRAM 9 stores temporary data or flags indicative of various states, and has a temporary storage area (storage area 9a for organizing the flash) for temporarily storing data for one sector of the flash memory, when erasing, adding, or changing data in the flash memory.

Reference numeral 10 denotes a flash memory having 1M bytes for storing data files, and including 16 sectors each having 64K bytes (rewritten in unit of 64K bytes). Further, one sector is divided into 256 small blocks (1 small block= 256 bytes).

Figure 2:
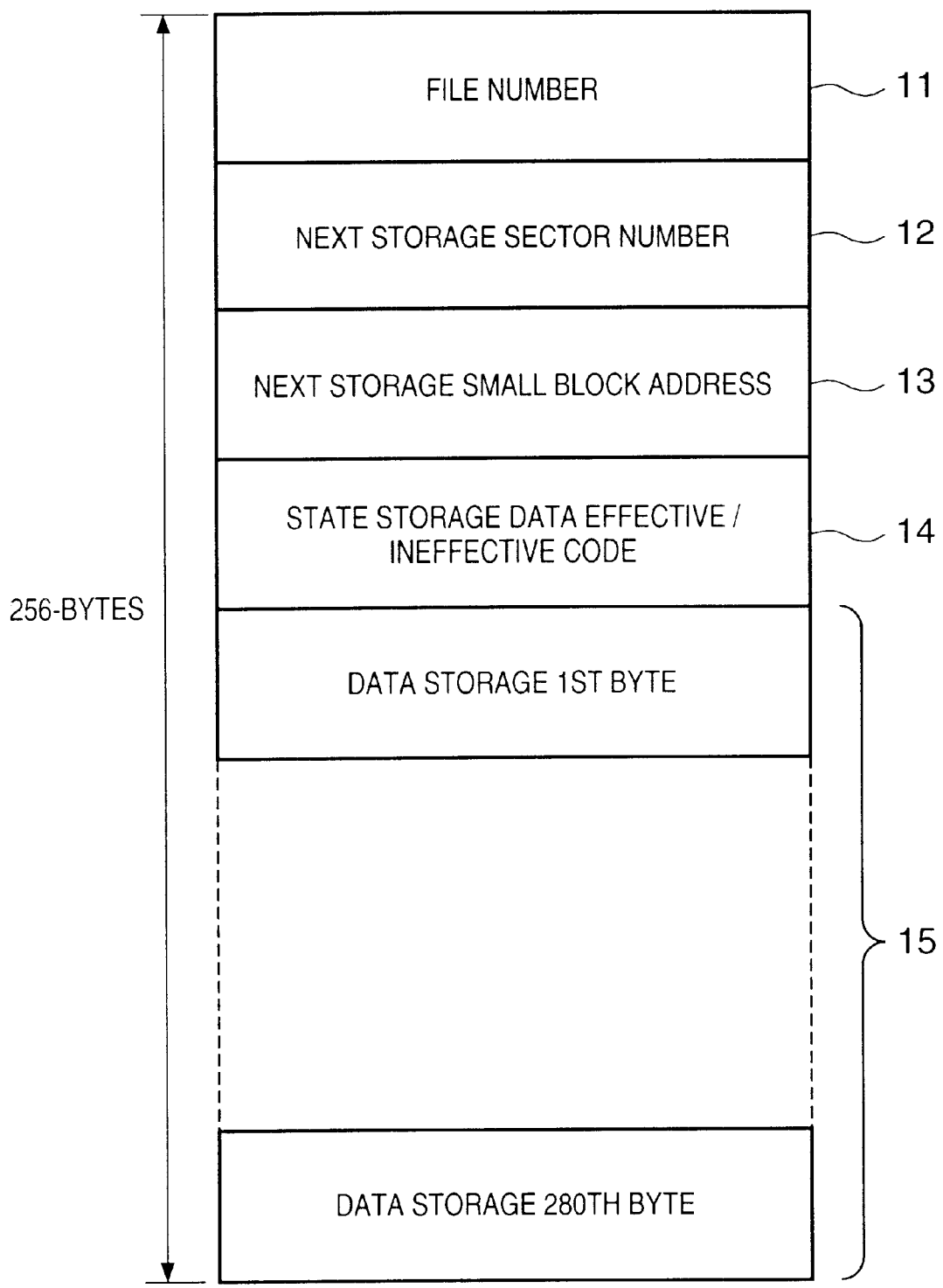
FIG. 2 shows a memory structure of a small block in a flash memory of the electronic device according to the first embodiment.

FIG. 2 shows the memory structure of the small block (256 bytes) in a flash memory.

In FIG. 2, reference numeral 11 denotes an area where file numbers are stored. In the present embodiment, 2 bytes are allocated. The file number area starts from the number 0001 which is incremented by one. Since the file numbers are counted by two bytes, up to 65,536 files can be stored. By referring to a file management index which will be described later with reference to FIG. 3, the position of a file in the flash memory 10 can be designated.

Naturally, there are cases where a single file exceeds 256 bytes. For such situation, areas 12 and 13 which will be described below are provided.

Reference numeral 12 denotes an area for storing a sector number in which a small block subsequent to (following) the small block of interest is stored. This area (one byte) is provided so that data can be stored among plural sectors.

Reference numeral 13 denotes an area (two bytes) storing a number for the subsequent small block (address information indicative of the position of the small block).

Reference numeral 14 denotes an area (one byte) storing data indicative of whether or not the small block is effective or ineffective. If the small block is effective, i.e., if the small block stores data, 7Fh (h is a hexadecimal number) is stored in the area 14, but if the small block is ineffective, 3Fh is stored in the area 14. The reason therefor is described later.

Reference numeral 15 denotes an area (250 bytes) storing actual data.

As described above, in a case where a single file is of a large size and constructed by plural blocks, plural small blocks are managed as a string of blocks by the aforementioned areas 12 and 13. In the area 12 for the last small block, non-existent data (e.g., 0) is written so as to indicate that there is no subsequent small block.

For example, in a case of a file whose data size is 900 bytes, four small blocks are constructed because 900/250= 3.6. In this case, the head small block is searched for by referring to the file management index (to be described later with reference to FIG. 3), and 250 bytes of the data area 15 in the head small block are read. Then, based on the data stored in the areas 12 and 13 of the head small block, the second small block is searched for and data (250 bytes) is read out of the second small block. In the similar manner, data is read sequentially from the third and fourth small blocks. From the fourth small block, the remaining 150 bytes are read. Since the area 12 of the fourth small block indicates that there is no subsequent small block, the reading process ends.

Note that herein, the size of one small block is made relatively small, i.e., one sector having 64K bytes is divided into 256 small blocks and each small block has 256 bytes, because the apparatus of the present embodiment is used as a portable electronic device. Since the device is used as a notepad or schedule organizer or the like, manually inputted data (characters or the like) is quite small compared to other applications such as a personal computer. In other words, if the size of one small block is increased to several thousands bytes, idle areas are generated. On the other hand, if the block size is made too small, the ratio of the index management data (6 bytes in the above example) to the actual data becomes large, causing poor data storage efficiency. In the present embodiment, 256 bytes are allocated to one block, wherein 250 bytes are allocated to a data area and 6 bytes are allocated for index management, because it is confirmed that this ratio is most suitable. As a matter of course, the size of the small block may be altered as necessary according to the purpose or the types of application used.

Figure 3:
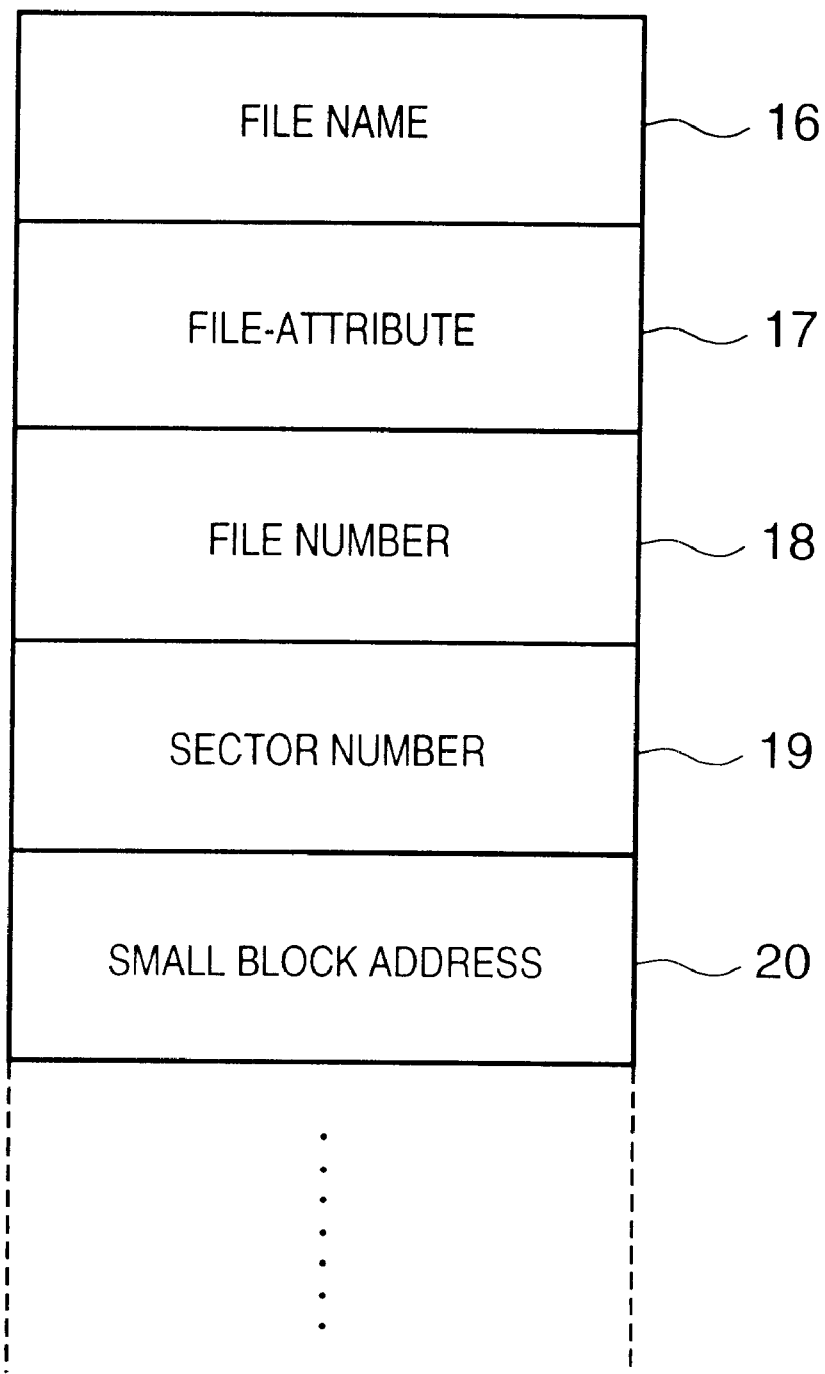
FIG. 3 shows a memory structure of a file management index according to the first embodiment.

FIG. 3 shows a memory structure of a file management index for a file according to the present embodiment.

In FIG. 3, reference numeral 16 denotes an area for storing a file name which has been inputted by a user. Reference numeral 17 denotes an area for storing file attributes, such as the date of file registration, the file format (text files, list files and so forth), categories or the like. Reference numeral 18 denotes an area for storing the file number. In the area 18, a binary value, which is incremented by one each time a new file is registered, is stored. Reference numeral 19 denotes a storage area for storing a sector number of the flash memory 10 in which the head small block of data of the designated file is stored. Reference numeral 20 denotes an area for storing the position (address) of an initial small block where data of the designated file is stored.

File management indexes exist as many as the number of files stored in the flash memory 10, and are used for accessing the corresponding file at the time of calling a file designated by a user for displaying, editing, or erasing.

Figure 4:
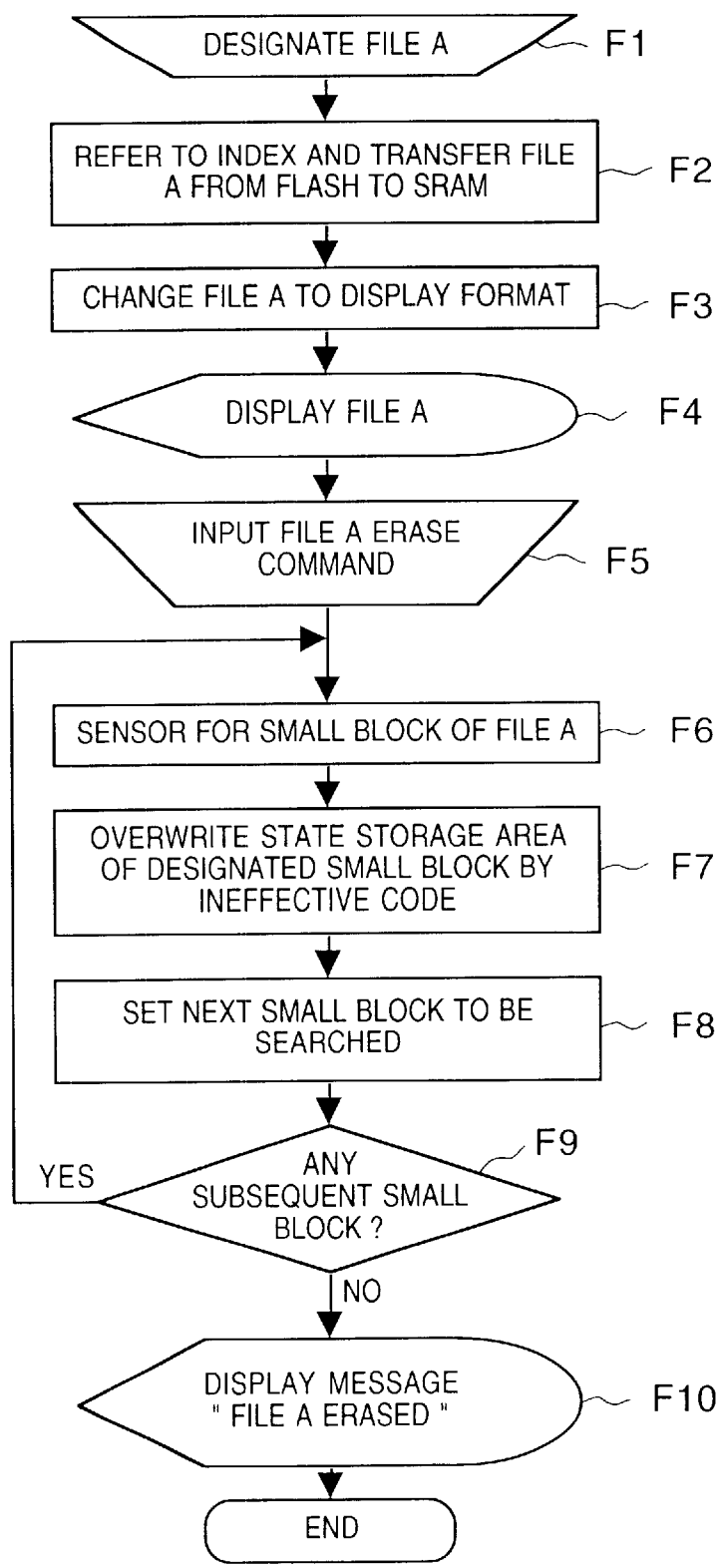
FIG. 4 is a flowchart of file erase processing according to the first embodiment.
Figure 5:
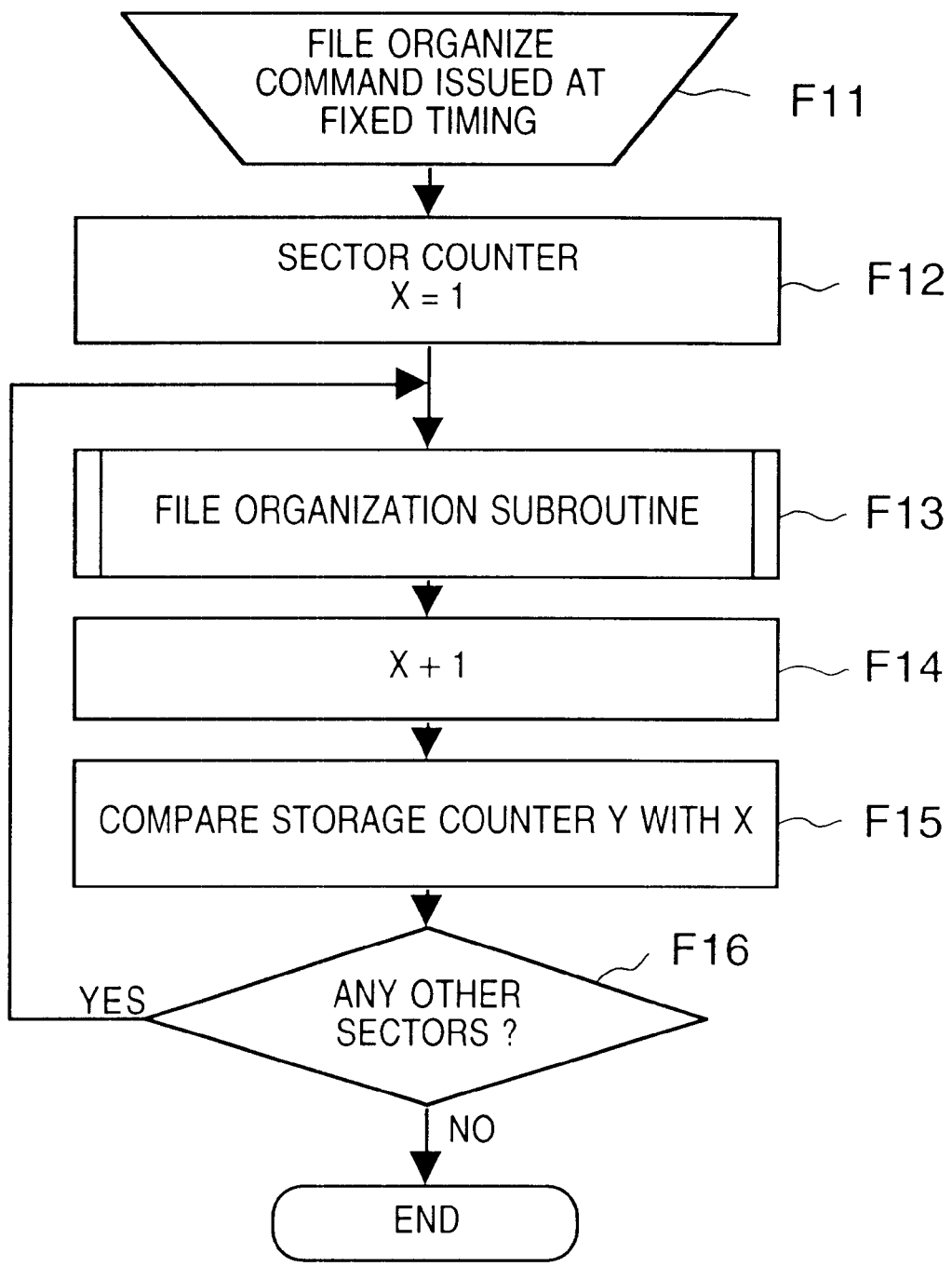
FIG. 5 is a flowchart of file organize processing according to the first embodiment.
Figure 6:
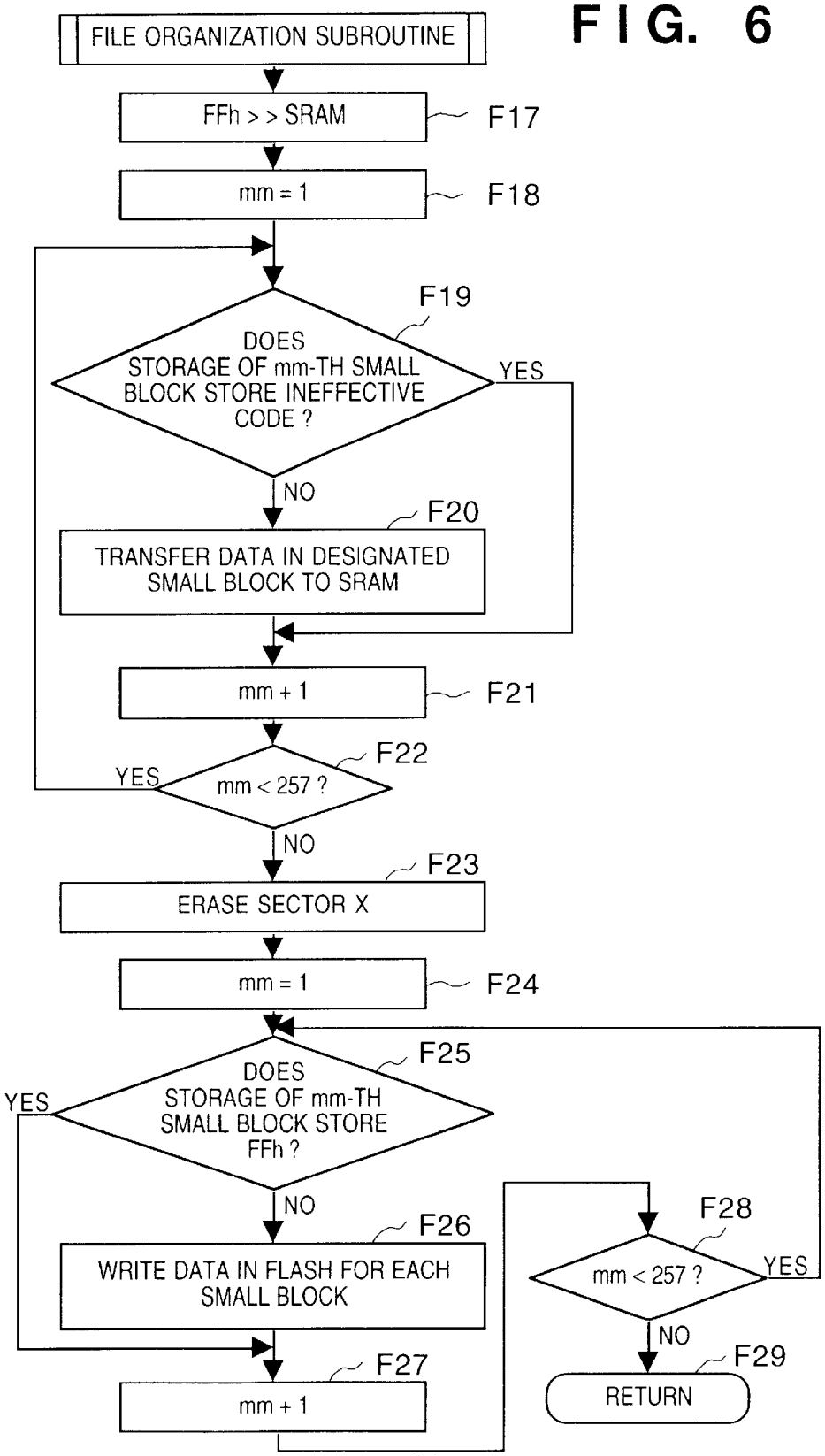
FIG. 6 is a flowchart of a subroutine for file organize processing according to the first embodiment.

FIGS. 4 to 6 are flowcharts showing processing steps of erasing a file in the flash memory 10 according to the present embodiment.

Note that the process flow will be described on the assumption of the followings.

FILEA: a file to be erased, which is designated by input means

X: a variable storing a sector number mm: a variable area storing address data for a small block of FILEA in the sector First, the flowchart in FIG. 4 is described.

In step F1, the name of FILEA is inputted by the input means (operation panel). In step F2, a file name which coincides with the inputted name of FILEA is searched for by referring to the file management index, and data of the found file is transferred to the SRAM 9.

In step F3, font data is called up based on the contents of the FILEA to convert character data to display image data, and the image data is displayed in step F4.

In step F5, a file erase command is inputted by the input means, and the process advances to step F6.

When the process advances to step F6 for the first time, a small block is searched based on the data stored in the areas 12 and 13 of the corresponding file management index. Then in step F7, the area 14 of the small block is overwritten by an ineffective code. As mentioned above, ineffective code 3Fh is written. An ineffective code can be written because, as the characteristic of a flash memory, when data is written, a bit cannot be changed from logical "0" to logical "1", but can be changed from logical "1" to logical "0". If the small block is effective, 7Fh is written. Note that FFh indicates an unused block.

In step F8, areas 12 and 13 of the small block of interest are read, and the next small block to be searched is set.

In step F9, based on the contents of the read area 12, it is determined whether or not there is a small block subsequent to the small block of interest. Determination can be made because, if there is no subsequent small block, non-existent data is stored in the area 12. If there is a subsequent small block, the process returns to step F6 to search for the next small block, and the above processes are repeated.

After writing an ineffective code with respect to all small blocks constructing the file subjected to erasing, the process advances to step F10 where a message is displayed to inform a user of erase completion.

According to the first embodiment, above-described simple processing, i.e., writing an ineffective code in the state storage area 14 of each small block, can realize erase processing. Therefore, the processing is extremely simplified and can be achieved at high speed. To an operator, it is perceived as if erase processing is completed immediately after the erase command.

Next, file organize processing according to the present embodiment is described with reference to the flowchart in FIG. 5. The file organize processing is executed when a file organize command is issued by the clock generator 2. The time at which the file organize command is issued is set by a user, for instance, an unused time, 2:00 AM, may be set. The command does not have to be issued every day, but may be issued at a predetermined time of every week, for instance.

As another example, file organize processing may be performed at a predetermined time, but only when the main power of the apparatus is off. Furthermore, as a condition of performing file organize processing, a predetermined capacity of, or a capacity larger than the predetermined capacity of battery may be added. In any event, it is preferable that file organize processing be automatically performed so that the user does not have to wait during operation.

When a file organize command is issued in step F11, the processing proceeds to step F12, and a variable X indicative of a subject sector is set to an initial value "1".

In step F13, an organize processing subroutine is called up for the sector designated by the variable X.

When the process returns from the subroutine, the variable X is incremented by "1" in step F14. In step F15, a counter Y (=16 in the present embodiment since flash memory=1M bytes and 1 sector=64K bytes), storing the sector number of the flash memory 10, is compared with the variable X.

The foregoing steps F13 to F16 are repeated until X>Y is determined in step F16.

Next, the file organize subroutine called up in the aforementioned step F13 is described with reference to the flowchart in FIG. 6.

In step F17, the flash organization storage area 9a, which is allocated in SRAM 9, is initialized with FFh. More specifically, the flash organization storage area 9a has the same capacity as 1 sector (64K bytes). Although the entire area may be initialized with FFh, in the present embodiment, FFh is written in the 6th byte from the head address of the flash organization storage area 9a, (256+6)th byte, and (512+6)th byte ... This process is equivalent to writing FFh in the area 14, where an effective/ineffective code for each small block is stored, in preparation for copying one sector of the flash memory 10 to the flash organization storage area 9a.

Next, in step F18, the variable mm is set to an initial value "1" as so as to indicate the first small block of the sector of interest (sector which has been designated by variable X in the upper process).

In step F19, the area 14 of the (mm)th small block of the sector X of the flash memory 10 is read to determine whether the small block is effective or ineffective.

If it is determined that the small block is effective, the process proceeds to step F20, and 256-byte data stored in the small block is copied to the address, (mm−1)×256, in the flash organization storage area 9a of the SRAM 9.

In step F21, the variable mm is incremented by "1", and the foregoing steps are repeated until it is determined in step F22 that the variable mm is less than "257".

As a result, an effective small block is copied to the flash organization storage area 9a, but ineffective small blocks are not copied. Moreover, copying processing is performed while maintaining the storage address position of the effective small block in the flash memory 10.

In step F23, the sector X (64K bytes) is erased.

After erasing the sector X, the processing proceeds to step F24 where the variable mm is initialized to "1".

In step F25, data stored in the 6th byte of the small block designated by the variable mm in the flash organization storage area 9a is read to determine whether or not the block is effective. Determination can be easily made because if it is effective, "7Fh" is stored at the position, while if it is ineffective, "FFh" is stored.

If the 6th byte of the small block is determined as effective, the process proceeds to step F26 where 256-byte data stored in the small block designated by the variable mm in the flash organization storage area 9a are written in the small block designated by the variable mm in the sector X of the flash memory 10, i.e., the address of (mm−1)×256 to mm×256−1, then the process proceeds to step F27.

In step F27, the variable mm is incremented by "1". In step F28, it is determined whether or not processing is completed for all the small blocks. If it has not been completed, the foregoing steps F25 to F26 are repeated.

When the organize processing with respect to the sector X is completed in the foregoing manner, the process returns (step F29) from the subroutine to the upper process (step F14 in FIG. 5).

In the foregoing manner, only the effective small blocks in the sector X prior to organize processing are written in the same sector X while maintaining the storage address, and ineffective small blocks are updated as an unused area. Moreover, only the effective small blocks are subjected (ineffective small blocks are not subjected) to copying (transferring) data from the flash memory to SRAM, and writing data from each small block of the SRAM to the flash memory. Therefore, no idle processing is performed, thus high-speed processing is realized.

According to the aforementioned embodiment, one sector (64K bytes), which is a physical block of a flash memory, is divided into small blocks (256 bytes) and the flash memory is managed by the small block configuration shown in FIG. 2. Therefore, files can be efficiently managed. Moreover, since data file erase processing is performed by the simple processing routine as shown in FIG. 4, a user receives an impression as if the file is erased instantly. Furthermore, since the storage position of an effective small block after file organization is completely the same as the position before the file organization, no change is necessary for the file management index which manages effective files. Thus, organizing the file management index after the file organize processing is virtually unnecessary. Further, because file organization is performed during the time at which a user does not particularly notice, it does not interfere with user's operation.

Note that although the present embodiment has described processing performed when a data file erase command is issued or processing for file organization, when data in a file is edited or added, or is edited by an external apparatus, or when a data file is received, it is necessary to erase an old data file. The present embodiment is applicable to these cases. Therefore, the present invention is not limited to the above-described case where an erase command is issued by a user.

Second Embodiment

Figure 7:
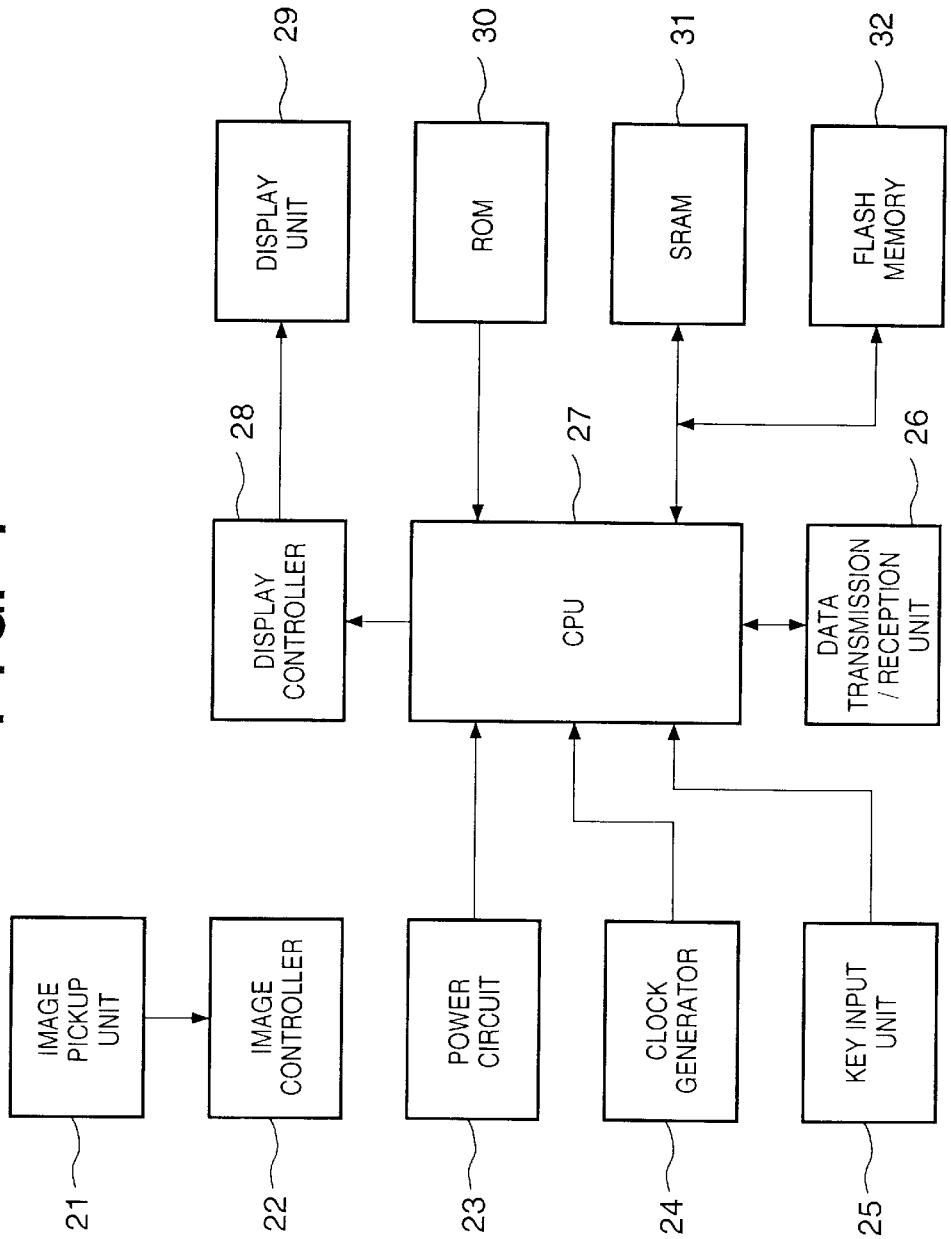
FIG. 7 is a block diagram of a digital camera according to a second embodiment of the present invention.

FIG. 7 is a block diagram of a digital camera as a second embodiment of the present invention.

In FIG. 7, reference numeral 21 denotes an image pickup unit constructed by an optical system such as a lens and a CCD image sensing device. Reference numeral 22 denotes an image controller which converts an image picked up by the image pickup unit 21 to digital data. Reference numeral 23 denotes a power circuit which supplies voltage to semiconductors such as the image pickup unit 21, image controller 22, CPU 27, flash memory 32, SRAM 31, ROM 30 and so on which will be described later, and generates voltage for a display device.

Reference numeral 24 denotes a clock generator which generates a high-speed clock for the CPU 27 to control data processing, a low-speed clock for time count, a low-speed clock for displaying, and a clock for image input. Reference numeral 25 denotes a key input circuit employing a key switch, including various keys such as shutter release key and so forth. Key depression operation is transferred to the CPU and triggers execution of various processing.

Reference numeral 26 denotes a data transmission/reception unit, e.g., RS232C, USB, IEEE1394 or the like, for performing data transmission/reception with an external device (e.g., personal computer, printer or the like). The transmission/reception unit 26 is used when, for instance, a picked-up image is transferred to a personal computer or printed by a printer, or when image data or the like is received from a personal computer.

Reference numeral 27 denotes a CPU which controls the entire apparatus. Operation process of the CPU is stored in ROM 30. Reference numeral 28 denotes a display controller which performs display control under the control of the CPU 27. Reference numeral 29 denotes an LCD display unit employing a liquid crystal displaying technique for displaying data received from the display controller 28. Reference numeral 30 denotes ROM storing various processing programs executed by the CPU 27 and font data. Reference numeral 31 denotes SRAM used as a work area of the CPU 27. Reference numeral 32 denotes a flash memory having a capacity of 1M bytes and includes 16 sectors each having 64K bytes, similar to the first embodiment. Note that because the second embodiment involves image data, at least 1K bytes are necessary for one frame of image data even if the image is compressed. Therefore, the first small block has the size of 1K bytes (=1024 bytes). In other words, small blocks are managed by 1 cluster=64 small blocks.

Figure 8:
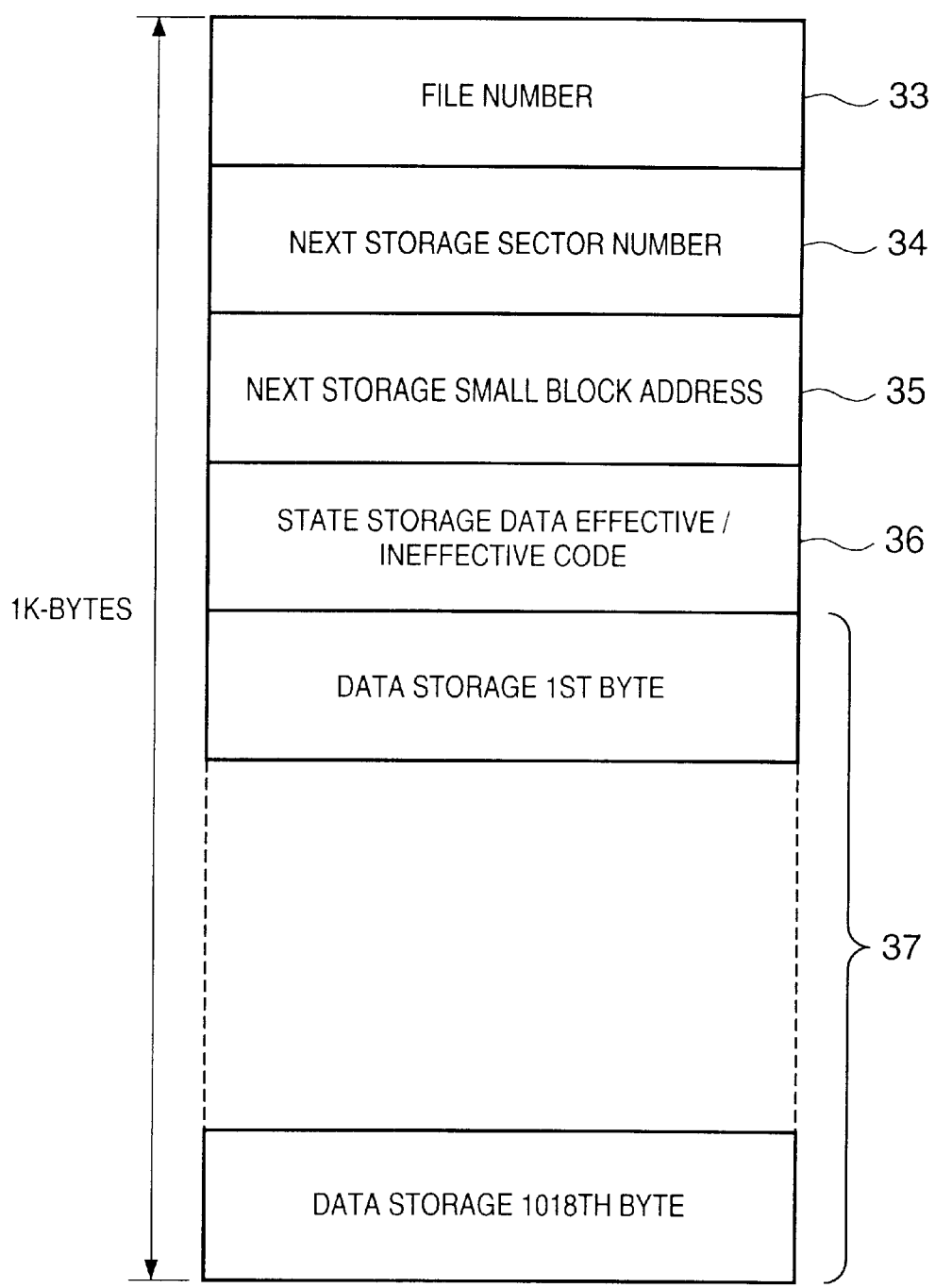
FIG. 8 shows a memory structure of a small block in a flash memory according to the Second embodiment.

The format of the small block according to the second embodiment is shown in FIG. 8. The management data portion (reference numerals 33 to 36) correspond to the areas 11 to 14 of the first embodiment. More specifically, 2 bytes are allocated to each of the areas 33 and 34, and 1 byte is allocated to each of the areas 35 and 36, thus the total of 6 bytes are allocated for the management data portion. The remaining 1018 bytes (=1024−6) are allocated to store actual compressed data.

Although it depends upon a picked-up image, compressed image data may naturally be divided and stored in plural small blocks. The connection among plural small blocks is managed by the areas 34 and 35 in FIG. 8 as similar to the first embodiment. It is also similar to the first embodiment in that data indicative of the last block is stored in the area 34 of the last small-block string.

Figure 9:
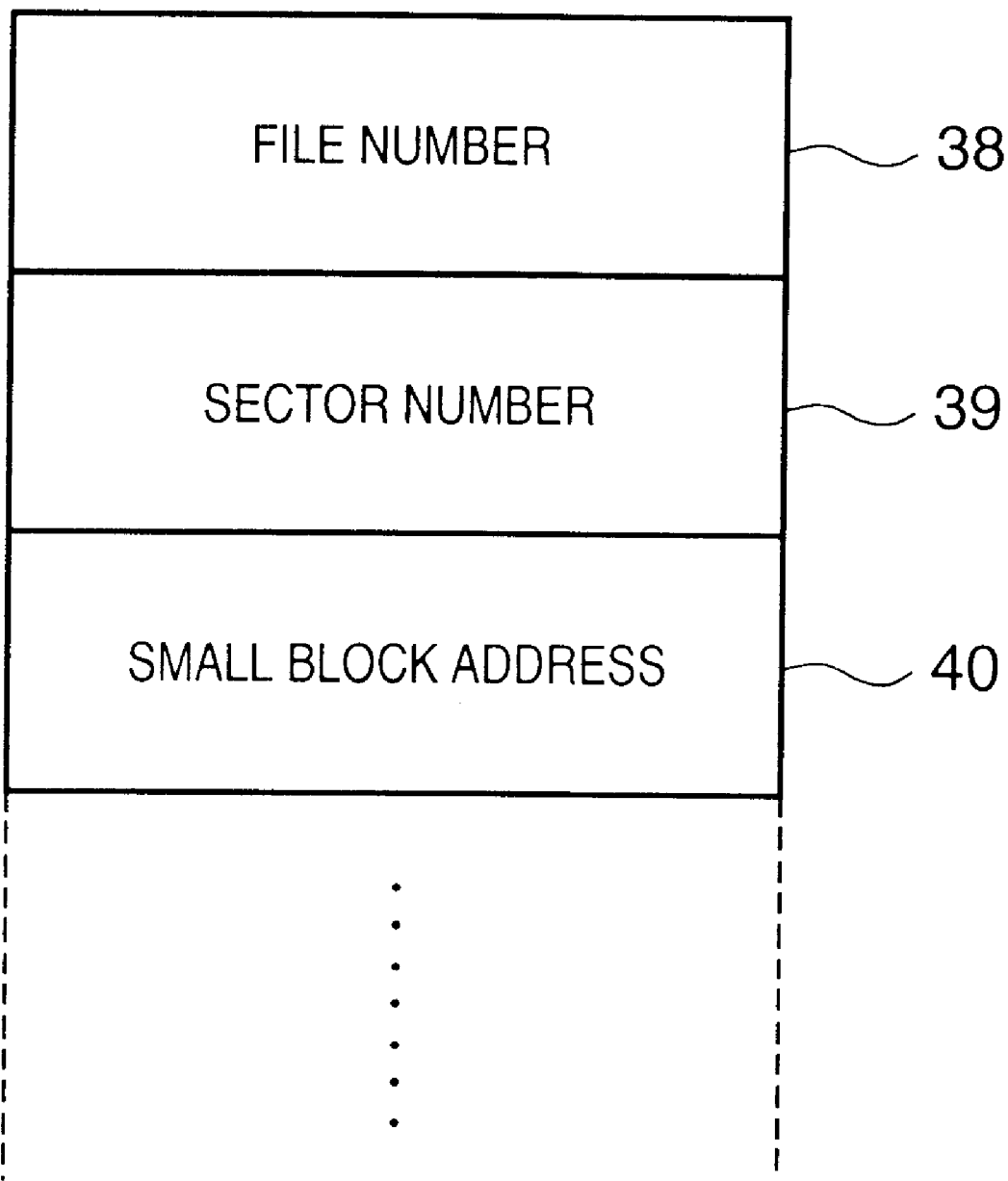
FIG. 9 shows a memory structure of a file management index according to the second embodiment.

FIG. 9 shows a memory structure of a file management index according to the second embodiment.

In FIG. 9, reference numeral 38 denotes an area (equivalent to the area 33 of the small block where a binary value is actually stored) for storing a file number, which stores a binary value incremented by one each time a new image file is registered at the time of image pickup by a digital camera. Reference numeral 39 denotes an area for storing a sector number of the flash memory where data of a designated file is stored. Reference numeral 40 denotes an area for storing an address of an initial small block of the data storage area of the flash memory where data of the designated file is stored. Since the first embodiment is a portable electronic device utilizing plural applications, attribute data is necessary for each file, but since the second embodiment handles only one type of image data, the file attribute area 17 described in the first embodiment in FIG. 3 is not necessary. Note that there are various image compression techniques (JPEG, Flash Pix and so on). If the image controller 22 performs compression at a high compression rate, an area for storing the type of the compression method may be provided.

The file erase processing according to the second embodiment is the same as that of the first embodiment. The processing only differs by the influence of the quadruple size of the small block.

More specifically, as shown in FIG. 4, at the time of erasing an image file, the area storing the state of each small block is overwritten by an ineffective code for making image file data ineffective. Then, file organize processing is performed as described in FIGS. 5 and 6.

As has been described above, according to the second embodiment, the present invention is applicable not only to a portable electronic device such as an electronic organizer or scheduler or a device integrating the above, but also to a digital camera.

Note that in the second embodiment, the size of one small block is assumed to be 1K bytes. However, it is preferable that the size of one small block be changed according to a resolution of the image pickup unit 21, i.e., image sensing device. For instance, a CCD having 8 billion pixels has a larger amount of image data than a CCD having 3.5 billion pixels. Thus, a relatively large size of the small block is set to increase the data storage efficiency.

Furthermore, although description has been provided that programs related to the various flowcharts of the above embodiments are stored in the ROM, the present invention is not limited to this, but programs may be externally supplied.

Further, the object of the present invention can also be achieved by providing a computer system or apparatus with a storage medium storing program codes of software realizing the functions of the above embodiments, reading the program codes by a computer (CPU or MPU) of the system or apparatus from the storage medium, and executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, according to the above embodiments, the processing for erasing data in a flash memory can be simplified by dividing a large block (sector) into small blocks and the state storage area of the small block is overwritten by an ineffective code. By this, the processing time can be reduced. Therefore, data erase processing can be sufficiently performed by a CPU which performs processing at relatively low speed.

Accordingly, it is possible to utilize an inexpensive system compared to a system using a CPU capable of high-speed processing.

Furthermore, the processing of erasing data stored in a flash memory is performed not when the file erase command is executed, but when file organization is performed, by detecting an ineffective code written in the state storage area. By this, the processing time of executing the file erase command is largely reduced.

As has been described above, according to the present invention, data stored in a flash memory can be performed at high speed with simple processing, thus operation environment can be improved.

The present invention is not limited to the above embodiments and various changes and modifications can be made within the spirit and scope of the present invention. Therefore, to apprise the public of the scope of the present invention, the following claims are made.

What is claimed is:

1. An electronic device having a flash memory, comprising:

management means dividing a sector of said flash memory indicative of an erase unit into a plurality of blocks, having an area for storing code data indicative of whether data stored in each block is effective or ineffective, and having file management data for managing a file by one or a plurality of blocks;

first erase means for writing an ineffective code in the area of each block constructing the file, when an erase request for erasing a file stored in said flash memory is inputted;

transfer means for transferring, sector by sector, effective blocks of the sector except blocks storing an ineffective code, to a predetermined volatile memory at a predetermined timing, while maintaining a relative position of a storage address of each effective block;

second erase means for erasing a sector of interest in the flash memory after transfer operation is performed by said transfer means; and write means for writing the effective blocks, which have been transferred to the volatile memory, in the erased sector while maintaining the relative position of the storage address of each effective block.

2. The electronic device according to claim 1, wherein said management data includes information which specifies a sector where a head block constructing the file is stored, and address information which indicates a storage position of the head block in the sector, and said block further includes information which indicates whether or not there is a subsequent block and which specifies an existing sector, address information indicating a storage position in the sector, and actual data.

3. The electronic device according to claim 1, wherein the erase request is instructed externally.

4. The electronic device according to claim 1, wherein the predetermined timing is the time set in advance.

5. The electronic device according to claim 1, wherein the ineffective code stored in said block is a code where at least one bit of the effective code is changed to "0".

6. The electronic device according to claim 1, wherein said electronic device is a digital camera.

7. A control method of an electronic device having a flash memory, comprising:

a management step of dividing a sector of said flash memory indicative of an erase unit into a plurality of blocks, having an area for storing code data indicative of whether data stored in each block is effective or ineffective, and having file management data for managing a file by one or a plurality of blocks;

a first erase step of writing an ineffective code in the area of each block constructing the file, when an erase request for erasing a file stored in said flash memory is inputted;

a transfer step of transferring, sector by sector, effective blocks of the sector except blocks storing an ineffective code, to a predetermined volatile memory at a predetermined timing, while maintaining a relative position of a storage address of each effective block;

a second erase step of erasing a sector of interest in the flash memory after transfer operation is performed by said transfer step; and a write step of writing the effective blocks, which have been transferred to the volatile memory, in the erased sector while maintaining the relative position of the storage address of each effective block.

8. A storage medium storing program codes which are read and executed by a computer, to function as an electronic device comprising a flash memory, said storage medium comprising:

program codes for management means dividing a sector of said flash memory indicative of an erase unit into a plurality of blocks, having an area for storing code data indicative of whether data stored in each block is effective or ineffective, and having file management data for managing a file by one or a plurality of blocks;

program codes for first erase means for writing an ineffective code in the area of each block constructing the file, when an erase request for erasing a file stored in said flash memory is inputted;

program codes for transfer means for transferring, sector by sector, effective blocks of the sector except blocks storing an ineffective code, to a predetermined volatile memory at a predetermined timing, while maintaining a relative position of a storage address of each effective block;

program codes for second erase means for erasing a sector of interest in the flash memory after transfer operation is performed by said transfer means; and program codes for write means for writing the effective blocks, which have been transferred to the volatile memory, in the erased sector while maintaining the relative position of the storage address of each effective block.

9. An electronic device having a flash memory, comprising:

management means dividing a sector of said flash memory indicative of an erase unit into a plurality of blocks, having in each block a status area storing code data indicative of whether data stored in the block is effective or ineffective, and having management data of a file for managing the file by one or a plurality of blocks; and erase means for writing an ineffective code over an effective code in the status area of each block constructing a specific file stored in said flash memory, without changing data in other areas of the block, when an erase request for erasing the specific file is inputted.

10. The electronic device according to claim 9, wherein the ineffective code stored in said block is a code where at least one bit of the effective code is changed to "0".

11. A control method of an electronic device having a flash memory, comprising:

a management step of dividing a sector of said flash memory indicative of an erase unit into a plurality of blocks, having in each block a status area storing code data indicative of whether data stored in the block is effective or ineffective, and having management data of a file for managing the file by one or a plurality of blocks; and an erase step of writing an ineffective code over an effective code in the status area of each block construction a specific file stored in said flash memory, without changing data in other areas of the block, when an erase request for erasing the specific file is inputted.

12. A storage medium storing program codes which re read and executed by a computer, to furnish as an electronic device comprising a flash memory, said storage medium comprising:

program codes for management means for dividing a sector of said flash memory indicative of an erase unit into a plurality of blocks, having in each block a status area storing code data indicative of whether data stored in the block is effective or ineffective, and having management data of a file for managing the file by one or a plurality of blocks; and program codes for erase means for writing an ineffective code over an effective code in the status area of each block constructing a specific file stored in said flash memory, without changing data in other areas of the block, when an erase request for erasing the specific file is inputted.

* * * * *

UNITED STATES PATENT AND TRADEMARK OFFICE
CERTIFICATE OF CORRECTION

PATENT NO.    : 6,378,033 B1
DATED         : April 23, 2002
INVENTOR(S)   : Hiroshi Nishikawa It is certified that error appears in the above-identified patent and that said Letters Patent is hereby corrected as shown below:

Column1 ,
Line 11, "use." should read -- used. --.

Column 2,
Line 39, "Second" should read -- second --; and
Line 46, "the," should read -- the --.

Column 3,
Line 27, ".employing" should read -- employing --.

Column 5,
Line 8, "followings." should read -- following. --

Column 12,
Line 31, "re" should read -- are --.

Signed and Sealed this

Eighth Day of October, 2002

Attest:

JAMES E. ROGAN
Attesting Officer         Director of the United States Patent and Trademark Office

UNITED STATES PATENT AND TRADEMARK OFFICE
CERTIFICATE OF CORRECTION

PATENT NO.     : 6,378,033 B1
DATED          : April 23, 2002
INVENTOR(S)    : Hiroshi Nishikawa It is certified that error appears in the above-identified patent and that said Letters Patent is hereby corrected as shown below:

<u>Title page,</u>
Item [73], Assignee, "Canon Kabushiki Kaisha, Tokyo (JP)" should read
-- Canon Electric Business Machines (H.K.) Co., Ltd., Hong Kong --.

Signed and Sealed this

Seventh Day of January, 2003

JAMES E. ROGAN
*Director of the United States Patent and Trademark Office*